US012809038B2

(12) United States Patent
Chen et al.

(10) Patent No.: US 12,809,038 B2
(45) Date of Patent: Nov. 24, 2026

(54) METHOD AND DEVICE FOR REALIZING PREDICTION OF OBSERVATION VALUE OF TRACKING STATION

(71) Applicant: TruePoint Technology Inc., Beijing (CN)

(72) Inventors: Kongzhe Chen, Beijing (CN); Guangyu Zhou, Beijing (CN); Hongzheng Cui, Beijing (CN)

(73) Assignee: TRUEPOINT TECHNOLOGY INC., Beijing (CN)

( * ) Notice: Subject to any disclaimer, the term of this patent is extended or adjusted under 35 U.S.C. 154(b) by 201 days.

(21) Appl. No.: 18/800,418

(22) Filed: Aug. 12, 2024

(65) Prior Publication Data

US 2025/0085440 A1 Mar. 13, 2025

(30) Foreign Application Priority Data

Sep. 8, 2023 (CN) ......................... 202311159765.5

(51) Int. Cl.
*G01S 13/44* (2006.01)
*G01S 19/29* (2010.01)
*G01S 19/44* (2010.01)

(52) U.S. Cl.
CPC .............. *G01S 19/44* (2013.01); *G01S 19/29* (2013.01)

(58) Field of Classification Search
CPC ........ G01S 19/07; G01S 19/072; G01S 19/29; G01S 19/40; G01S 19/43; G01S 19/44
See application file for complete search history.

(56) References Cited

FOREIGN PATENT DOCUMENTS

CN 106646538 A * 5/2017 ........... G01S 19/235
CN 106842236 A * 6/2017 ............. G01S 19/20
CN 108169774 A * 6/2018 ............. G01S 19/33

OTHER PUBLICATIONS

First Office Action with Search Report issued in Chinese Patent Application No. 202311159765.5, mailed Oct. 20, 2023; 10 pgs.

* cited by examiner

*Primary Examiner* — Timothy A Brainard
(74) *Attorney, Agent, or Firm* — HAUPTMAN HAM, LLP

(57) ABSTRACT

This application discloses a method and a device for realizing prediction of an observation value of a tracking station. Based on a static tracking station, in a case that data of the tracking station does not arrive at a processing center accurately and timely, by using an observation value at a reference epoch of the tracking station and variations between the reference epoch and a current epoch, an observation value at a moment of the current epoch of the tracking station is predicted. In this way, an accurate observation value that can be used for data processing of PPP or network RTK can be predicted, so that positioning performance of the PPP and the RTK for serving users is improved.

11 Claims, 1 Drawing Sheet

METHOD AND DEVICE FOR REALIZING PREDICTION OF OBSERVATION VALUE OF TRACKING STATION

RELATED APPLICATIONS

The present application claims priority from Chinese Application Number 202311159765.5 filed Sep. 8, 2023, the disclosure of which is hereby incorporated by reference herein in its entirety.

TECHNICAL FIELD

This application relates to but is not limited to the satellite navigation technologies, and in particular, to a method and a device for realizing prediction of an observation value of a tracking station.

BACKGROUND

The satellite positioning system, with high precision and covering the whole world, has been widely applied in a plurality of fields such as navigation, surveying and mapping, precision agriculture, intelligent robots, and unmanned driving, and unmanned aerial vehicles. At present, there are five widely used global navigation satellite systems (Global Navigation Satellite Systems, GNSSs) in the world, that is, the global positioning system (Positioning System, GPS) of the United States, global navigation satellite system (Global Navigation Satellite System, GLONASS) of Russia, Beidou (BeiDou) of China, the global navigation satellite system Galileo of the European Union, and the Quasi-Zenith satellite system (Quasi-Zenith Satellite System, QZSS) of Japan.

Main error sources that affect accuracy of satellite positioning comprise satellite orbit errors, clock bias errors, and atmospheric propagation errors. Knowledge of such errors is critical to understanding the accuracy of satellite positioning and related applications.

The satellite orbit errors and the clock bias errors resolved in real time by using broadcast ephemeris are generally meter-level. For example, errors of GPS broadcast ephemeris are about one meter, and errors of GLONASS broadcast ephemeris may be several meters. The atmospheric propagation errors are mainly ionospheric errors and tropospheric errors. At noon, the ionospheric error may be up to several tens of meters for a low-elevation satellite, and a dual-frequency receiver can mitigate the ionospheric error by using a dual-frequency observation value. A tropospheric delay may be up to 10 meters for the low-elevation satellite, and 90% of the tropospheric error can be mitigated by using a tropospheric model. In the absence of a precise orbit clock bias or other corrections, a high-performance dual-frequency receiver can only achieve meter-level point positioning accuracy.

For industries that require centimeter-level positioning accuracy, such as surveying and mapping, precision agriculture, intelligent robots, unmanned aerial vehicles, and intelligent driving, real-time kinematic (Real-Time Kinematic, RTK) positioning and precision point positioning (Precise Point Positioning, PPP) are two of the most widely used high-precision satellite positioning technologies. In the RTK positioning, by using error correlations between observation values of adjacent receivers, a tracking station is established at a place where the location is known. Satellite clock bias errors are completely eliminated by using a single difference between the tracking station and a rover station. In addition, satellite orbit errors, ionospheric errors, and tropospheric errors can be greatly mitigated. If a distance between two stations is short, for example, less than 10 kilometers, the residual after single difference is performed on observation values of the base station and the rover station is only in a centimeter level. Therefore, the RTK positioning can provide centimeter-level relative positioning accuracy. In the PPP positioning, precise orbit data and clock bias data are used to mitigate the satellite orbit errors and clock bias error from the broadcast ephemeris. The ionospheric errors are mitigated by using a dual-frequency ionosphere-free combination, and the tropospheric errors can be mitigated by using model and parameter estimation. Centimeter-level precision can also be achieved in the PPP positioning after ambiguity convergence or fixing.

In the RTK positioning, positioning errors are mitigated by using error correlations between a base station and a rover station. The error correlations diminish as a distance between the base station and the rover station becomes longer. A shorter distance between the base station and the rover station indicates a stronger error correlation, and a longer distance indicates a weaker correlation. After the distance between the base station and the rover station exceeds a specific distance, for example, 30 kilometers, atmospheric residuals may reach decimeter level, and double-difference ambiguities are difficult to be fixed. Consequently, centimeter-level positioning cannot be implemented. To satisfy the wide range of high-precision applications such as precision agriculture, intelligent driving, and unmanned aerial vehicles, it is generally necessary to build up a plurality of physical base stations to form a base station network. For multi-base station systems, the VRS (Virtual Reference Station) technology is adopted. A plurality of physical base stations are used to observe data. A physical base station coverage area is divided into a plurality of grids. Data of a virtual reference station at each grid center point is generated by using data from physical base stations around to provide reference data of the grid where a rover is located for a client. For the RTK positioning, more data of virtual reference stations than that of physical base stations can be generated, so that the distance between the base station and the rover station is further shortened, and a number of physical base stations can be reduce, and this is a commonly adopted mode in the current multi-base station system. In an VRS system, a server transmits to the rover station data of the virtual reference station closest to a rover station according to locations of the rover station, so that the rover station can form a short baseline. In the PPP positioning, data of tens or even hundreds of physical tracking stations distributed worldwide or covering the whole country are used to resolve precise orbit and clock bias parameters of navigation satellites in real time. The precise orbit and clock bias data can be used by users to mitigate orbit errors and clock bias errors in positioning.

If the data of the tracking station cannot arrive at a data processing center of the PPP positioning or the RTK positioning correctly and timely due to the network or the receiver, a probability of ambiguity change of a network RTK positioning user caused by removing the tracking station is increased, and consequently, performance of precision data in the PPP positioning is reduced, and a time delay of the precision data is increased, resulting in greatly reduced positioning performance of the PPP and the RTK for serving users.

SUMMARY

This application provides a method and a device for realizing prediction of an observation value of a tracking station, to improve positioning performance of PPP and RTK for serving users.

An embodiment of the present invention provides a method for realizing prediction of an observation value of a tracking station, comprising:

determining that an observation value of a current epoch of a tracking station cannot be used in data processing;

obtaining the following variations between epochs: a variation of a geometrical distance from the tracking station to a satellite between the current epoch and a reference epoch, a variation of a tropospheric error and a variation of an ionospheric error between the current epoch and the reference epoch, and a variation of a clock bias of the satellite between the current epoch and the reference epoch; and estimating the observation value of the current epoch according to an observation value of the reference epoch of the tracking station and the obtained variations.

In an exemplary embodiment, correctly decoding an observation value of a new epoch following the reference epoch of the tracking station further comprising: updating the saved observation value of the reference epoch of the tracking station with the observation value of the new epoch.

In an exemplary embodiment, the determining that an observation value of a current epoch of a tracking station cannot be used in data processing comprises:

before cut-off time of each processing period, determining, in a case that observation of the tracking station has arrived at a data processing center correctly, that the observation value of the current epoch of the tracking station can be used in the data processing; and determining, in a case that the observation of the tracking station does not arrive at the data processing center or has arrived at the processing center but error bits exist in transmission, that the observation value of the current epoch of the tracking station cannot be used in the data processing.

The cut-off time of each processing period is equal to a sum of the observation time-tag of current epoch and a data delay threshold that is preset.

In an exemplary embodiment, the data delay threshold is 0.5 seconds.

In an exemplary embodiment, the reference epoch is an epoch n epochs previous to the current epoch, and n is greater than or equal to 1.

In an exemplary embodiment, a time difference between the reference epoch and the current epoch is a predictable duration threshold, and the predictable duration threshold is less than or equal to 10 seconds.

In an exemplary embodiment, the observation value of the current epoch is estimated by using the following equation:

$$\hat{P}^i_{m+n,k} = P^i_{m,k} + \Delta\rho^i_{m,m+n} - c\cdot\Delta dt^i_{s,m,m+n} + \Delta Trop^i_{m,m+n} + \frac{f_1^2}{f_k^2}\Delta Iono^i_{m,m+n};$$

and $$\hat{\Phi}^i_{m+n,k} = \Phi^i_{m,k} + \Delta\rho^i_{m,m+n} - c\cdot\Delta dt^i_{s,m,m+n} + \Delta Trop^i_{m,m+n} - \frac{f_1^2}{f_k^2}\Delta Iono^i_{m,m+n}.$$

$$\hat{P}^i_{m+n,k}$$

represents a pseudorange observation value of the current epoch of the tracking station for frequency k of a satellite i, $$\hat{\Phi}^i_{m+n}$$

represents a carrier observation value of the current epoch of the tracking station for frequency k of the satellite i, $$P^i_{m,k}$$

represents a pseudorange observation value of the reference epoch of the tracking station for frequency k of the satellite i, and $$\Phi^i_{m,k}$$

represents a carrier observation value of the reference epoch of the tracking station for frequency k of the satellite i.

$$\Delta\rho^i_{m,m+n}$$

represents a variation of a geometrical distance from the tracking station to the satellite i between the current epoch and the reference epoch.

$$\Delta dt^i_{s,m,m+n}$$

represents a variation of a clock bias of the satellite i between the current epoch and the reference epoch.

$$\Delta Trop^i_{m,m+n}$$

represents the variation of the tropospheric error between the current epoch and the reference epoch.

$$\Delta Iono^i_{m,m+n}$$

represents the variation of the ionospheric error between the current epoch and the reference epoch.

c represents the speed of light in vacuum, $$f_1^2$$

represents the square of the frequency of the first frequency, $$f_k^2$$

represents the square of the frequency of the k$^{th}$ frequency, and value of k can be 1, 2, 3, or 4.

The current epoch is an epoch m+n, the reference epoch is an epoch m, and m and n are integers greater than or equal to 1.

An embodiment of this application further provides a computer-readable storage medium, having computer-executable instructions stored thereon. The computer-executable instructions are used for performing any one of the foregoing methods for realizing prediction of an observation value of a tracking station.

An embodiment of this application further provides an apparatus for realizing prediction of an observation value of a tracking station, comprising a memory and a processor. The memory has instructions executable by the processor, and the instructions are used for performing steps of any one of the foregoing methods for realizing prediction of an observation value of a tracking station.

An embodiment of this application further provides a device for realizing prediction of an observation value of a tracking station, comprising a determining module, an obtaining module, and a prediction module.

The determining module is configured to determine that an observation value of a current epoch of a tracking station cannot be used in data resolving processing.

The obtaining module is configured to obtain the following variations between epochs: a variation of a geometrical distance from the tracking station to a satellite between the current epoch and a reference epoch, a variation of a tropospheric error and a variation of an ionospheric error between the current epoch and the reference epoch, and a variation of a clock bias of the satellite between the current epoch and the reference epoch.

The prediction module is configured to estimate the observation value of the current epoch according to an observation value of the reference epoch of the tracking station and the obtained variations.

In an exemplary embodiment, the apparatus further comprises an update module configured to: correctly decode an observation value of a new epoch following the reference epoch of the tracking station; and update the saved observation value of the reference epoch of the tracking station with the observation value of the new epoch.

In an exemplary embodiment, the determining module is configured to:

- before cut-off time of each processing period, determine, in a case that observation of the tracking station does not arrive at a data processing center or has arrived at the processing center but error bits exist in transmission, that the observation value of the current epoch of the tracking station cannot be used in the data processing.

The cut-off time of each processing period is equal to a sum of the observation time-tag of current epoch and a data delay threshold that is preset.

According to the embodiments of this application, based on a static tracking station, in a case that data of the tracking station does not arrive at a processing center accurately and timely, by using an observation value of a reference epoch of the tracking station and variations between the reference epoch and a current epoch, an observation value at a moment of the current epoch of the tracking station is predicted. In this way, an accurate observation value that can be used for data processing of PPP or network RTK can be predicted, so that positioning performance of the PPP and the RTK for serving users is improved.

Other features and advantages of the present invention is set forth in the following description, and in part is apparent from the description, or may be understood by implementing the present invention. The objectives and other advantages of the present invention can be achieved and obtained through the structure particularly pointed out in the description, claims, and accompanying drawings.

BRIEF DESCRIPTION OF THE DRAWINGS

The accompanying drawings are provided to further understand the technical solution of this application, and constitute a part of the description. The accompanying drawings, along with embodiments of this application, are used to explain the technical solution of this application, and do not constitute a limitation to the technical solution of this application.

DETAILED DESCRIPTION

Figure 1:
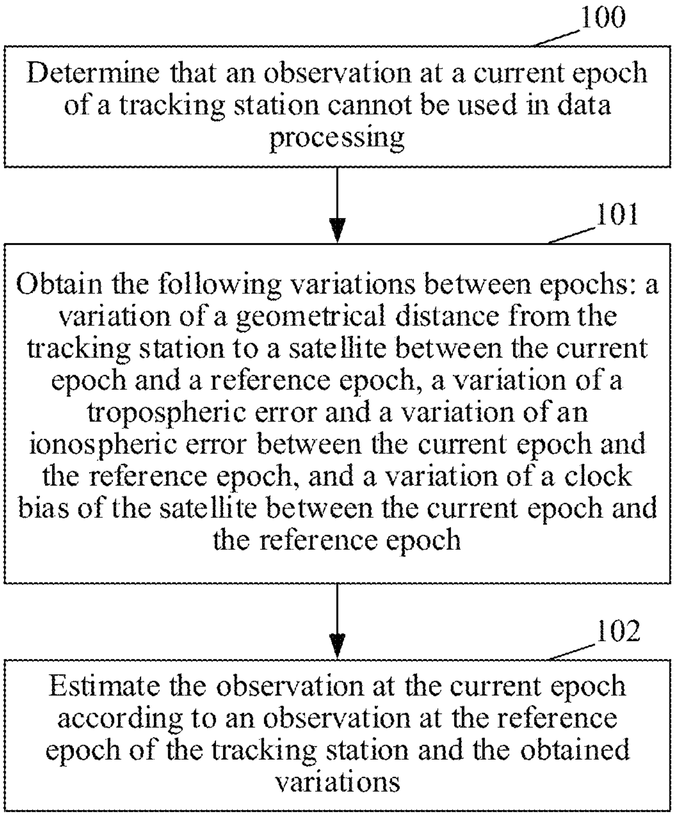
FIG. 1 is a schematic flowchart of a method for realizing prediction of an observation value of a tracking station according to an embodiment of this application.

To describe the objectives, the technical solutions, and the advantages of this application more clearly, embodiments of this application are described in detail below with reference to the accompanying drawings. It should be noted that the embodiments in this application and features in the embodiments may be arbitrarily combined with each other in the case of no conflict.

To facilitate understanding of this application, this application is described in details below with reference to the related drawings. Some embodiments of this application are shown in the accompanying drawings. However, this application can be implemented in many different forms and is not limited to the embodiments described herein. Rather, the objectives of the embodiments are to provide a thorough understanding of the disclosure of this application.

Unless otherwise defined, meanings of all technical and scientific terms used in this specification are the same as those usually understood by a person skilled in the art to which this application pertains. In the specification, terms used in the specification of this application are merely intended to describe the objectives of the specific embodiments, but are not intended to limit this application.

In may be understood that the terms "first" and "second" used in this application are merely for the purpose of description, and shall not be construed as indicating or implying relative importance or implicitly indicating a quantity of indicated technical features. Therefore, a feature defined by "first" or "second" may explicitly indicate or implicitly comprise at least one of such features. In description of this application, "a plurality of" means at least two, such as two and three, unless otherwise specifically defined.

It may be understood that "connection" in the following embodiments should be understood as "electrical connection", "communication connection", and the like if electrical signals or data is transmitted between the connected circuits, modules, units, and the like.

As used herein, the singular forms of "a", "an", and "said/the" may also comprise plural forms, unless the context clearly indicates otherwise. It should also be understood that the terms "comprise/include", "have", and the like indicate the presence of the stated feature, entirety, step, operation, component, part, or combination thereof, but do not exclude the possibility of the presence or addition of one or more other features, entireties, steps, operations, components, parts, or combination thereof. In addition, the term "and/or" used in the specification comprise s any and all combinations of related listed items.

Whether RTK positioning or PPP positioning, users need to use precision data comprising virtual reference station data in the RTK positioning or precise orbit clock bias data in the PPP positioning. Such precision data (the virtual reference station data or the satellite orbit clock bias data) is time-efficient. A difference between a time-tag of an observation value of a rover station and a time-tag of the precision data is referred to as the age of differential. A smaller age of differential indicates a better correction effect of the precision data. When a client purchases a network RTK or PPP service, the client generally tests the age of differential of the service. For example, the client may require no more than one second of age of differential. For the network RTK and PPP services, the age of differential may generally be divided into three parts, that is, the time of arrival of data of a tracking station at a processing center, the time of precision data processing, and the time of arrival of the precision data at users from the processing center.

The processing of the precision data may be implemented by using a cloud computing service. The time for implemented the processing is generally controllable, and a service provider may shorten the processing time by only increasing investments.

The time of arrival of the precision data at the users may be affected by network conditions of the users. However, the age of differential of one second required by the users is generally set forth in a case that networks of the users are stable. In this case, it may be considered that the time of arrival of the precision data at the users from the processing center is also controllable in a case that the networks of the users are good.

The time of arrival the data of the tracking station at the resolving center is often not controllable. Regardless in the network RTK or PPP, physical tracking stations are widely distributed. Some tracking stations are built in the inaccessible deserts, and data of the tracking stations is transmitted in a wireless manner. Tracking stations may encounter reset or restart sometime. In addition, there are a large number of network RTK and PPP tracking stations, for example, as few as a few hundred and as many as a few thousand. Some tracking stations may have network congestion on a data transmission link or error bits in transmission. In other words, it is difficult to control data of so many tracking stations of different network conditions to arrive at the resolving center correctly within one second. In this case, server may discard data of the tracking station that does not arrive correctly at the resolving center within specified time, or wait till data arrival. However, such approach may affect positioning performance of final users. Waiting data arrival affects the differential age, normally server discards data that does not arrive correctly within specified time. In network RTK resolving, if data of a specific tracking station does not arrive within specified time or error bits exist in received data, processing software may discard the tracking station and perform re-networking. Consequently, ambiguity change may occur in all virtual reference stations using the tracking station as a starting point, and users using data of the virtual reference stations need to search for ambiguity again. In PPP satellite orbit and clock bias processing, if data of a specific tracking station does not arrive within specified time, processing software discards the data of the tracking station, and this may directly result in a reduction in accuracy of a final satellite orbit and a clock bias. In satellite orbit determination processing, accuracy of a satellite orbit and a clock bias is proportional to the density of a tracking station, and more tracking stations indicate higher accuracy of precision data. Therefore, an approach in which data of a tracking station does not arrive at a processing center within specified time may degrade positioning performance of the PPP and the RTK for serving users.

There are various factors that may cause the tracking station data to not arrive at the data resolving center of the PPP or network RTK service correctly and timely, such as network congestion, error bits in data transmission, delay in outputting the data of the tracking station, and tracking station reset or restart. This also means that the data of the tracking station cannot be used in the data resolving processing. To ensure that the users receive the latest data of precise orbit clock bias or the latest data of the virtual reference station timely, the data processing centers of the PPP and network RTK generally do not wait for the data of the tracking station with a delay exceeding one second. Tracking stations with data delays exceeding one second or tracking stations with error bits in data transmission are excluded from the current processing. Removing a specific tracking station may affect dynamic networking of the network RTK service processing, and further affect reinitialization of ambiguity of the users of the network RTK near the tracking station, resulting in a reduced RTK fixing rate of the user. In addition, removing a specific tracking station may affect performance of the precise orbit clock products, and consequently, positioning performance of the users of the products is affected.

An observation value received in the satellite positioning is predictable. In a prediction method of conventional technology, a carrier observation value of a receiver at a next epoch or a next second is predicted based on a latest carrier and a Doppler observation value of the receiver. However, because the Doppler observation value has large noise, accuracy of the predicted carrier observation value is low. The prediction methods are mainly used for predicting a carrier observation value range of a receiver at a next epoch, to improve tracking efficiency. Such a predicted carrier observation value with large errors is not possible to be used as an observation value of a tracking station in data processing of PPP or network RTK.

In embodiments of this application, antennas of a receiver of a tracking station are all built on static observation points under open sky, and precise coordinates of the antennas are known. In other words, the tracking station in embodiments of this application is static and precise coordinates are known. To predict and obtain accurate observation values that can be used in data resolving of the PPP or the network RTK and improve positioning performance of the PPP and the RTK for serving users, an embodiment of this application provides a method for realizing prediction of an observation value of a tracking station, aiming at predicting, by using an arrived observation value of a previous epoch of the tracking station in a case that data of the tracking station does not arrive at a processing center accurately and timely, an observation value of a current epoch of the tracking station is predicted. In this way, even though data of some tracking stations does not reach the processing center within one second in some cases, the observation values predicted may be used for processing. In this way, numbers of dynamic networking in the network RTK and ambiguity change are reduced, and an impact of reduced tracking stations on performance of a PPP orbit and a clock bias can be reduced, thereby improving positioning performance of the PPP and the RTK for serving users.

FIG. 1 is a schematic flowchart of a method for realizing prediction of an observation value of a tracking station according to an embodiment of this application. As shown in FIG. 1, the method may comprise the following steps.

Step 100: Determine that an observation value of a current epoch of a tracking station cannot be used in data processing.

In an exemplary embodiment, in network RTK or PPP data processing, a data delay threshold of the tracking station may be set. For example, the data delay threshold may be set to 0.5 seconds. In other words, the observation time-tag of current epoch and the precise data delay threshold of the user may be used as cut-off time for data of the tracking station to arrive at the resolving center. The processing period may be an integer second interval such as one second or two seconds, or may be a non-integer second interval such as 0.1 second or 0.2 seconds. In this case, before the cut-off time of each processing period, when observations from all tracking stations are checked, in a case that an observation value of current time-tag of a specific tracking station has arrived at the processing center correctly, it is determined that the observation value of current epoch of the tracking station can be used in the data processing, and the process of this application ends and the observation from the tracking station is used for subsequent processing. In a case that an observation value of the current time-tag of a tracking station does not arrive at the processing center, it is determined that the observation value of the current epoch of the tracking station cannot be used in the data processing, and step 101 continues to be performed. In a case that the an observation value of the current time-tag of a tracking station does has arrived at the processing center but error bits exist in transmission, it is determined that the observation value of the current epoch of the tracking station cannot be used in the data processing, and step 101 continues to be performed.

In an exemplary embodiment, step 100 may comprise:

before the cut-off time of each processing period, checking whether observation from the tracking station arrives at a data processing center, and determining, in a case that the observation of the tracking station has arrived at the data processing center correctly, that the observation value of the current epoch of the tracking station can be used in the data processing, and ending the process of this application; and determining, in a case that the observation of the tracking station does not arrive at the data resolving center or has arrived at the processing center but error bits exist in transmission, that the observation value of the current epoch of the tracking station cannot be used in the data processing. The cut-off time of each processing period is equal to a sum of the observation time-tag of current epoch and a data delay threshold that is preset.

Step 101: Obtain the following variations between epochs: a variation of a geometrical distance from the tracking station to a satellite between the current epoch and a reference epoch, a variation of a tropospheric error and a variation of an ionospheric error between the current epoch and the reference epoch, and a variation of a clock bias of the satellite between the current epoch and the reference epoch.

In an exemplary embodiment, the reference epoch is an epoch n epochs previous to the current epoch, and n is greater than or equal to 1.

In an exemplary embodiment, an example in which the data processing center receives an observation value of an epoch m of a specific tracking station is used. It is assumed that an observation value of an epoch m+1 of the tracking station does not arrive at the data processing center correctly and timely due to network or receiver issues. In this case, the data processing center may predict the observation value of the epoch m+1 according to the observation value of the epoch m, and use the observation value predicted by the tracking station in processing precision data or virtual reference station data of the epoch m+1. In this case, the epoch m of the tracking station is a reference epoch of the epoch m+1 of the tracking station.

In an exemplary embodiment, in a case that the observation value of the epoch m+1 of the tracking station does not arrive at the data processing center in time, if an observation value of an epoch m+2 of the tracking station still does not arrive at the data processing center correctly and timely, and the observation value of the epoch m+1 of the tracking station is still not received before the data resolving center starts to resolve precision data or virtual reference station data of the epoch m+2, the observation value of the epoch m of the tracking station may be continuously used to predict the observation value of the epoch m+2 of the tracking station and used in the processing. In this case, the epoch m of the tracking station is a reference epoch of the epoch m+2 of the tracking station.

An actual observation value of a specific epoch of a tracking station may predict observation values of the tracking station for a subsequent long period of time. However, considering that there are errors in a variation that is of an atmospheric delay error between epochs and that is resolved by using parameters, such as a tropospheric delay calculated by using tropospheric parameters can be used to mitigate only about 90% of tropospheric errors, although a tropospheric variation between two epochs is less than one centimeter, the remaining 10% of the errors are approaching one millimeter. Therefore, to ensure centimeter-level accuracy of carrier observation values, in an embodiment, a predictable duration threshold may be controlled to be within 10 seconds. To be specific, when an observation value of an epoch m+n of the tracking station is predicted by using the observation value of the epoch m of the tracking station, a maximum time difference between the epoch m+n and epoch m is 10 seconds, that is, the predictable duration threshold is less than or equal to 10 seconds. m and n are integers greater than or equal to 1.

In an exemplary embodiment, the method further comprises: saving the observation value of the reference epoch of the tracking station. In an embodiment, the method further comprises: correctly decoding an observation value of a new epoch following the reference epoch of the tracking station; and updating the saved observation value of the reference epoch of the tracking station with the observation value of the new epoch.

Each epoch that has an observation value of a tracking station decoded correctly may be used as a reference epoch for a subsequent epoch of the tracking station, and an observation value of the reference epoch is saved in a memory. Subsequently, after the observation value of a new epoch of the tracking station is correctly decoded, the observation value of the reference epoch that is saved is updated. In this way, if an observation value of any epoch of the tracking station is not correctly decoded in time, the observation value of the current epoch can be estimated by using the observation value of the latest reference epoch.

For a receiver of the tracking station, signals of one of, a plurality of, or all of satellite systems, such as the GPS, the GLONASS, the BDS, the Galileo, and the QZSS, may be tracked, and observation values may be in single frequency, dual-frequency, or multi-frequency. At the epoch m, a specific tracking station tracks a pseudorange observation value $$P^i_{m,k}$$

and a carrier observation value $$\phi^i_{m,k}$$

of frequency k of a specific satellite i. An observation equation thereof can be expressed as shown in Equation (1) and Equation (2) respectively:

$$P^i_{m,k} = \rho^i_m + c\cdot\left(dT_{m,r} - dt^i_{m,s}\right) + Trop^i_m + \frac{f_1^2}{f_k^2} Iono^i_m + v^i_{m,k} \tag{1}$$

$$\Phi^i_{m,k} = \rho^i_m + c\cdot\left(dT_{m,r} - dt^i_{m,s}\right) + Trop^i_m - \frac{f_1^2}{f_k^2} Iono^i_m + \lambda_k N^i_{m,k} + \varepsilon^i_{m,k} \tag{2}$$

At the next epoch m+1, the tracking station tracks a pseudorange observation value $$P^i_{m+1,k}$$

and a carrier observation value $$\phi^i_{m+1,k}$$

of the frequency k of the satellite i. An observation equation thereof can be expressed as shown in Equation (3) and Equation (4) respectively:

$$P^i_{m+1,k} = \rho^i_{m+1} + c\cdot\left(dT_{m+1,r} - dt^i_{m+1,s}\right) + Trop^i_{m+1} + \frac{f_1^2}{f_k^2} Iono^i_{m+1} + v^i_{m+1,k} \tag{3}$$

$$\Phi^i_{m+1,k} = \rho^i_{m+1} + c\cdot\left(dT_{m+1,r} - dt^i_{m+1,s}\right) + Trop^i_{m+1} - \frac{f_1^2}{f_k^2} Iono^i_{m+1} + \lambda_k N^i_{m+1,k} + \varepsilon^i_{m+1,k} \tag{4}$$

In Equation (1) to Equation (4), k represents a frequency identifier, and a value of k may be 1, 2, 3, or 4.

$$\rho^i_m$$

represents a geometrical distance between the tracking station and the satellite i at the epoch m.

$$\rho^i_{m+1}$$

represents a geometrical distance between the tracking station and the satellite i at the epoch m+1. c represents the speed of light in vacuum. $dT_{m,r}$ represents a clock bias of the receiver comprised in the observation value at the epoch m. $dT_{m+1,r}$ represents a clock bias of the receiver comprised in the observation value at the epoch m+1.

$$dt^i_{m,s}$$

represents a clock bias of the satellite i at the epoch m.

$$dt^i_{m+1,s}$$

represents a clock bias of the satellite i at the epoch m+1.

$$Trop^i_m$$

represents a tropospheric error comprised in the observation value at the epoch m.

$$Trop^i_{m+1}$$

represents a tropospheric error comprised in the observation value at the epoch m+1.

$$Iono^i_m$$

represents an ionospheric error comprised in the observation value at the epoch m.

$$Iono^i_{m+1}$$

represents an ionospheric error comprised in the observation value at the epoch m+1.

$$f_1^2 \text{ and } f_k^2$$

represent the square of frequencies of the first frequency and the $k^{th}$ frequency respectively, and the value of k may be 1, 2, 3, or 4. $\lambda_k$ represents a carrier wavelength of the frequency k, and the value of k may be 1, 2, 3, or 4.

$$N^i_{m,k} \text{ and } N^i_{m+1,k}$$

represent integer ambiguities comprised in the carrier observation values at the epoch m and the epoch m+1 respectively.

$$v^i_{m,k} \text{ and } v^i_{m+1,k}$$

represent pseudorange observation value noise at the epoch m and the epoch m+1 respectively.

$$\varepsilon^i_{m,k} \text{ and } \varepsilon^i_{m+1,k}$$

represent carrier observation value noise at the epoch m and the epoch m+1 respectively.

In an exemplary embodiment, an example in which the current epoch is the epoch m+1, and the reference epoch is a previous epoch of the current epoch, namely, the epoch m, is used. Subtraction is made between the observation values at the epoch m+1 and the epoch m, and an observation equation of single difference of the frequency k of the satellite i can be obtained as shown in Equation (5) and Equation (6):

$$P^i_{m+1,k} - P^i_{m,k} = \Delta\rho^i_{m,m+1} + c\cdot(\Delta dT_r - \Delta dt^i_s) + \Delta Trop^i_{m,m+1} + \frac{f_1^2}{f_k^2}\Delta Iono^i_{m,m+1} + \Delta v^i_k \tag{5}$$

$$\Phi^i_{m+1,k} - \Phi^i_{m,k} = \Delta\rho^i_{m,m+1} + c\cdot(\Delta dT_r - \Delta dt^i_s) + \Delta Trop^i_{m,m+1} - \frac{f_1^2}{f_k^2}\Delta Iono^i_{m,m+1} + \lambda_k \Delta N^i_k + \Delta\varepsilon^i_k \tag{6}$$

In Equation (5) and Equation (6), Δ represent a single difference operator.

The observation value at the epoch m is expressed by using the observation value at the epoch m+1, to obtain Equation (7) and Equation (8) shown as follows:

$$P^i_{m+1,k} = P^i_{m,k} + \Delta\rho^i_{m,m+1} + c\cdot(\Delta dT_{r,m,m+1} - \Delta dt^i_{s,m,m+1}) + \Delta Trop^i_{m,m+1} + \frac{f_1^2}{f_k^2}\Delta Iono^i_{m,m+1} + \Delta v^i_k \tag{7}$$

$$\Phi^i_{m+1,k} = \Phi^i_{m,k} + \Delta\rho^i_{m,m+1} + c\cdot(\Delta dT_{r,m,m+1} - \Delta dt^i_{s,m,m+1}) + \Delta Trop^i_{m,m+1} - \frac{f_1^2}{f_k^2}\Delta Iono^i_{m,m+1} + \lambda_k \Delta N^i_{k,m,m+1} + \Delta\varepsilon^i_k \tag{8}$$

It can be learned from Equation (7) and Equation (8) that the observation value at the epoch m+1 can be expressed as the observation value at the epoch m plus some variations between the two epochs. The variations comprise the following:

A variation $$\Delta\rho^i_{m,m+1}$$

of a geometrical distance from the tracking station to a satellite between the two epochs of the current epoch and the reference epoch. In an embodiment, different from a dynamic receiver that cannot predict an exact location of the receiver at a next epoch, the static tracking station in this embodiment of this application is unchanged and known in location. In addition, coordinates of the satellite can be accurately calculated through ephemeris. Therefore, the geometrical distance at each epoch between the receiver and the satellite can be accurately calculated, so that the variation $$\Delta\rho^i_{m,m+1}$$

of the geometrical distance from the tracking station to the satellite between the two epochs can be calculated.

A variation $$\Delta Trop^i_{m,m+1}$$

of a tropospheric error between the two epochs of the current epoch and the reference epoch and a variation $$\Delta Iono^i_{m,m+1}$$

of an ionospheric error between the two epochs of the current epoch and the reference epoch. The tropospheric error of each satellite may be calculated by using a tropospheric model, and the ionospheric error of each satellite may also be calculated by using an ionospheric model, so that the variation of the tropospheric error between two epochs and the variation of the ionospheric error between the two epochs can be calculated.

A variation $$\Delta dt^i_{s,m,m+1}$$

of a clock bias of the satellite between the two epochs of the current epoch and the reference epoch. A high-performance atomic clock is adopted on the satellite, and the broadcast ephemeris also comprises calculation parameters of a clock bias of the satellite. In this case, the variation of clock bias between the two epochs can be calculated through the parameters of the broadcast ephemeris.

A variation $\Delta dT_{r,m,m+1}$ of a clock bias of the receiver between the two epochs of the current epoch and the reference epoch. An atomic clock on the receiver is not as stable as the atomic clock on the satellite. However, because all observation values at one epoch comprise the same receiver clock bias, the receiver clock bias is eliminated in the final RTK positioning regardless of changes of the receiver clock bias between the two epochs. In other words, the receiver clock bias may be considered to be unchanged in observation value prediction, that is, $\Delta dT_{r,m,m+1}=0$.

A variation $$\Delta N^i_{k,m,m+1}$$

of carrier ambiguity of the frequency k of the satellite i between the two epochs of the current epoch and reference epoch. If tracking is continuous, the carrier ambiguity remains unchanged, that is, $$\Delta N^i_{k,m,m+1} = 0.$$

Single-difference pseudorange observation value noise $$\Delta v_k^i$$

and single-difference carrier observation value noise $$\Delta \varepsilon_k^i$$

are amounts of white noise with a mean value of 0, and are negligible in the observation value prediction.

Step 102: Estimate the observation value at the current epoch according to the observation value at the reference epoch of the tracking station and the obtained variations.

In summary, after $\Delta dT_{r,m,m+1}$, $$\Delta N_{k,m,m+1}^i,\ \Delta v_{k,m,m+1}^i,\ \text{and}\ \Delta \varepsilon_{k,m,m+1}^i$$

are neglected, in an embodiment, the current epoch is the epoch m+1, and the reference epoch is a previous epoch of the epoch m+1, namely, the epoch m. Equation (7) and Equation (8) may be simplified as shown in Equation (9) and Equation (10) respectively:

$$\hat{P}_{m+1,k}^i = P_{m,k}^i + \Delta\rho_{m,m+1}^i - c\cdot\Delta dt_{s,m,m+1}^i + \Delta Trop_{m,m+1}^i + \frac{f_1^2}{f_k^2}\Delta Iono_{m,m+1}^i \quad (9)$$

$$\hat{\Phi}_{m+1,k}^i = \Phi_{m,k}^i + \Delta\rho_{m,m+1}^i - c\cdot\Delta dt_{s,m,m+1}^i + \Delta Trop_{m,m+1}^i - \frac{f_1^2}{f_k^2}\Delta Iono_{m,m+1}^i \quad (10)$$

In Equation (9) and Equation (10), the speed of light c in vacuum is a known constant, and the square of the frequency of the first frequency $$f_1^2$$

and the square of the frequency of the $k^{th}$ frequency $$f_k^2$$

are known quantities. The variation $$\Delta\rho_{m,m+1}^i$$

of the geometrical distance from the tracking station to the satellite between the two epochs, the variation $$\Delta dt_{s,m,m+1}^i$$

of the clock bias of the satellite between the two epochs, the variation $$\Delta Trop_{m,m+1}^i$$

of the tropospheric error between the two epochs, and the variation $$\Delta Iono_{m,m+1}^i$$

of the ionospheric error between the two epochs can be obtained by parameter calculation.

In this way, if the data processing center of the PPP or the RTK receives the observation value of the epoch m, the pseudorange observation value $$\hat{P}_{m+1,k}^i$$

and the carrier observation value $$\hat{\phi}_{m+1,k}^i$$

of the next epoch, namely, the epoch m+1, may be estimated according to Equation (9) and Equation (10) based on the pseudorange observation value $$P_{m,k}^i$$

and the carrier observation value $$\phi_{m,k}^i$$

of the epoch m and the obtained variations, that is, the variation $$\Delta\rho_{m,m+1}^i$$

of the geometrical distance from the tracking station to the satellite between the two epochs, the variation $$\Delta dt_{s,m,m+1}^i$$

of the clock bias of the satellite between the two epochs, the variation $$\Delta Trop_{m,m+1}^i$$

of the tropospheric error between the two epochs, and the variation $$\Delta Iono^{i}_{m,m+1}$$

of the ionospheric error between the two epochs.

In an embodiment, an example in which the current epoch is the epoch m+n, and the reference epoch is an epoch n epochs previous to the epoch m+n, namely, the epoch m, is used. Equation (7) and Equation (8) may be simplified as shown in Equation (11) and Equation (12) respectively:

$$\hat{P}^{i}_{m+n,k} = P^{i}_{m,k} + \Delta\rho^{i}_{m,m+n} - c\cdot\Delta dt^{i}_{s,m,m+n} + \Delta Trop^{i}_{m,m+n} + \frac{f_1^2}{f_k^2}\Delta Iono^{i}_{m,m+n} \quad (11)$$

$$\hat{\Phi}^{i}_{m+n,k} = \Phi^{i}_{m,k} + \Delta\rho^{i}_{m,m+n} - c\cdot\Delta dt^{i}_{s,m,m+n} + \Delta Trop^{i}_{m,m+n} - \frac{f_1^2}{f_k^2}\Delta Iono^{i}_{m,m+n} \quad (12)$$

In Equation (11) and Equation (12), n may be 1, 2, . . . , or 10. The variation of the geometrical distance from the tracking station to the satellite between the two epochs of the current epoch and the reference epoch is $$\Delta\rho^{i}_{m,m+n}.$$

The variation of the clock bias of the satellite between the two epochs of the current epoch and the reference epoch is $$\Delta dt^{i}_{s,m,m+n}.$$

The variation of the tropospheric error between the two epochs of the current epoch and the reference epoch is $$\Delta Trop^{i}_{m,m+n}.$$

The variation of the ionospheric error between the two epochs of the current epoch and the reference epoch is $$\Delta Iono^{i}_{m,m+n}.$$

It can be learned from Equation (11) and Equation (12) that the method for realizing prediction of an observation value of a tracking station provided in this embodiment of this application is to calculate, based on a latest actual observation value, the variation of the clock bias of the satellite, the ionospheric variation, the tropospheric variation, and the variation of the geometrical distance from the tracking station to the satellite of each observation value from an actual observation value moment to a current moment at which the observation value prediction needs to be performed, to calculate the pseudorange observation value and carrier observation value of the tracking station at the current prediction moment.

According to the method for realizing prediction of an observation value of a tracking station provided in the embodiments of this application, based on a static tracking station, in a case that data of the tracking station does not arrive at a processing center accurately and timely, by using an observation value at a reference epoch of the tracking station and variations between the reference epoch and a current epoch, an observation value at a moment of the current epoch of the tracking station is predicted. In this way, an accurate observation value that can be used for data processing of PPP or network RTK can be predicted, so that positioning performance of the PPP and the RTK for serving users is improved. In an embodiment, when observation values of some tracking stations are not sent to the data processing center correctly and timely due to network or receiver output issues in a short time, the observation value predicted can be used for processing. In this way, processing of the PPP and the network RTK is not affected, numbers of dynamic networking in the network RTK and ambiguity change are reduced, and an impact of reduced tracking stations on performance of a PPP orbit and a clock bias is reduced, thereby improving positioning performance of the PPP and the RTK for serving users.

In an exemplary embodiment, according to this embodiment of this application, if due to poor network conditions, a data delay of each group of observation values of a specific tracking station to arrive at the processing center exceeds the data delay threshold, for example, 0.5 second, but within 1.5 seconds, using the processing period is one second as an example, the tracking station needs to predict the observation value every processing period. However, a time span of the prediction is only one second, and a prediction error is small. If an observation data delay of a specific tracking station stabilizes between 1.5 seconds and 2.5 seconds, time span of the prediction is two seconds, and so on. There are few cases in which an observation data delay of a tracking station always exceeds two seconds. Therefore, the time span of the prediction is generally short. According to the method for realizing prediction of an observation value of a tracking station provided in this embodiment of this application, a plurality of tracking stations with poor network states can be always used in a data processing service without being removed, and real-time performance of a final data service is ensured.

In an embodiment, if a specific group of observation values of specific tracking station are wrong due to error bits and is discarded, and observation values at previous moment have arrived at the data processing center correctly, the processing center only needs to predict the observation value of the tracking station at an error bit moment.

In an embodiment, if a specific tracking station experiences a loss of consecutive groups of observation data due to network disruption, observation values of the tracking station in a network disruption period need to be predicted. If the data interruption exceeds a predictable duration threshold, such as 10 seconds, the prediction of the tracking station on the observation value can be terminated. The observation value of the tracking station is temporarily not used for processing, and after the network is recovered, whether the prediction is performed is determined according to the delay of observation value of the tracking station arriving at the data processing center.

This application further provides a computer-readable storage medium, having computer-executable instructions stored thereon. The computer-executable instructions are used for performing any one of the foregoing methods for realizing prediction of an observation value of a tracking station.

This application further provides a device for realizing prediction of an observation value of a tracking station, comprising a memory and a processor. The memory has instructions executable by the processor, and the instructions are used for performing steps of any one of the foregoing methods for realizing prediction of an observation value of a tracking station.

Figure 2:
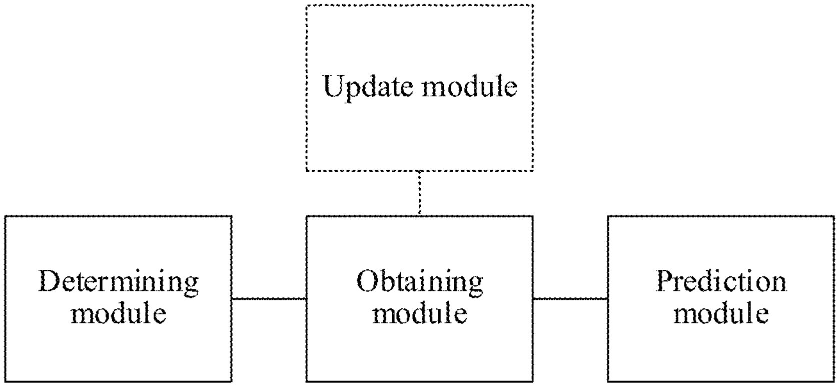
FIG. 2 is a schematic diagram of a composition structure of a device for realizing prediction of an observation value of a tracking station according to an embodiment of this application.

FIG. 2 is a schematic diagram of a composition structure of a device for realizing prediction of an observation value of a tracking station according to an embodiment of this application. As shown in FIG. 2, the apparatus may comprise a determining module, an obtaining module, and a prediction module.

The determining module is configured to determine that an observation value at a current epoch of a tracking station cannot be used in data processing.

The obtaining module is configured to obtain the following variations between epochs: a variation of a geometrical distance from the tracking station to a satellite between the current epoch and a reference epoch, a variation of a tropospheric error and a variation of an ionospheric error between the current epoch and the reference epoch, and a variation of a clock bias of the satellite between the current epoch and the reference epoch.

The prediction module is configured to estimate the observation value at the current epoch according to an observation value at the reference epoch of the tracking station and the obtained variations.

In an exemplary embodiment, the apparatus further comprises an update module configured to: update, in a case that an observation value at a new epoch following the reference epoch of the tracking station is correctly decoded, the saved observation value at the reference epoch of the tracking station is updated with the observation value at the new epoch.

In an exemplary embodiment, the determining module may be configured to:

before cut-off time of each processing period, determine, in a case that observation data of the tracking station has arrived at a data resolving center correctly, that the observation value at the current epoch of the tracking station can be used in the data processing; and determine, in a case that the observation data of the tracking station does not arrive at the data processing center or has arrived at the processing center but error bits exist in transmission, that the observation value at the current epoch of the tracking station cannot be used in the data processing.

The cut-off time of each processing period is equal to a sum of the observation time-tag of current epoch and a data delay threshold that is preset.

In an exemplary embodiment, the prediction module may be configured to estimate the observation value at the current epoch by using Equation (11) and Equation (12). In this embodiment of this application, the current epoch is an epoch m+n, the reference epoch is an epoch m, and m and n are integers greater than or equal to 1.

According to the device for realizing prediction of an observation value of a tracking station provided in the embodiments of this application, based on a static tracking station, in a case that data of the tracking station does not arrive at a processing center accurately and timely, by using an observation value at a reference epoch of the tracking station and variations between the reference epoch and current epoch, an observation value at a moment of the current epoch of the tracking station is predicted. In this way, an accurate observation value that can be used for data processing of PPP or network RTK can be predicted, so that positioning performance of the PPP and the RTK for serving users is improved.

Although the implementations disclosed in this application are as the above, the contents are only implementations for facilitating understanding this application and are not used to limit this application. Any person skilled in the art to which this application pertains can make any modifications and variations in the forms and details of implementation without departing from the spirit and the scope disclosed in this application. However, the patent protection scope of this application should still be subject to the scope defined by the appended claims.

The invention claimed is:

1. A method for realizing prediction of an observation value of a tracking station, comprising:

determining, before cut-off time of each processing period, in a case that observation of the tracking station does not arrive at a data processing center or has arrived at the data processing center but there are errors in transmission, that the observation value of a current epoch of the tracking station cannot be used in data processing, wherein the cut-off time of each processing period is equal to a sum of an observation time-tag of the current epoch and a preset data delay threshold;

obtaining variations between the current epoch and the reference epoch, the variations comprising: a variation of a geometrical distance from the tracking station to a satellite between the current epoch and a reference epoch, a variation of a tropospheric error and a variation of an ionospheric error between the current epoch and the reference epoch, and a variation of a clock bias of the satellite between the current epoch and the reference epoch; and estimating the observation value of the current epoch according to the observation value of the reference epoch of the tracking station and the obtained variations.

2. The method according to claim 1, further comprising, in response to correctly decoding the observation value of a new epoch after the reference epoch of the tracking station: updating the saved observation value of the reference epoch of the tracking station with the observation value of the new epoch.

3. The method according to claim 1, wherein the data delay threshold is 0.5 seconds.

4. The method according to claim 1, wherein the reference epoch is a epoch which is n epochs previous to the current epoch, and n is greater than or equal to 1.

5. The method according to claim 4, wherein a time difference between the reference epoch and the current epoch is a predictable duration threshold, and the predictable duration threshold is less than or equal to 10 seconds.

6. The method according to claim 1, wherein the observation value of the current epoch is estimated by using following equations:

$$\hat{P}^i_{m+n,k} = P^i_{m,k} + \Delta\rho^i_{m,m+n} - c\cdot\Delta dt^i_{s,m,m+n} + \Delta Trop^i_{m,m+n} + \frac{f_1^2}{f_k^2}\Delta Iono^i_{m,m+n};$$

and $$\hat{\Phi}^i_{m+n,k} = \Phi^i_{m,k} + \Delta\rho^i_{m,m+n} - c\cdot\Delta dt^i_{s,m,m+n} + \Delta Trop^i_{m,m+n} - \frac{f_1^2}{f_k^2}\Delta Iono^i_{m,m+n},$$

wherein $$\hat{P}^{i}_{m+n,k}$$

represents a pseudorange observation value at the current epoch of the tracking station for tracking a frequency k of a satellite i, $$\hat{\Phi}^{i}_{m+n,k}$$

represents a carrier observation value at the current epoch of the tracking station for tracking the frequency k of the satellite i, $$P^{i}_{m,k}$$

represents a pseudorange observation value at the reference epoch of the tracking station for tracking the frequency k of the satellite i, and $$\Phi^{i}_{m,k}$$

represents a carrier observation value at the reference epoch of the tracking station for tracking the frequency k of the satellite i;

$$\Delta\rho^{i}_{m,m+n}$$

represents the variation of a geometrical distance from the tracking station to the satellite i between the current epoch and the reference epoch;

$$\Delta dt^{i}_{s,m,m+n}$$

represents the variation of a clock bias of the satellite i between the current epoch and the reference epoch;

$$\Delta Trop^{i}_{m,m+n}$$

represents the variation of the tropospheric error between the current epoch and the reference epoch;

$$\Delta Iono^{i}_{m,m+n}$$

represents the variation of the ionospheric error between the current epoch and the reference epoch;

c represents a speed of light in vacuum, $$f_1^2$$

represents the square of a frequency of the first frequency, $$f_k^2$$

represents the square of a frequency of the $k^{th}$ frequency, and a value of k is 1, 2, 3, or 4; and the current epoch is an epoch m+n, the reference epoch is an epoch m, and m and n are integers greater than or equal to 1.

7. A non-transitory computer-readable storage medium, having computer-executable instructions stored thereon, wherein the computer-executable instructions are used for performing the method for realizing prediction of an observation value of a tracking station according to claim 1.

8. An apparatus for realizing prediction of an observation value of a tracking station, comprising a memory and a processor, wherein the memory has instructions executable by the processor, and the instructions are used for performing steps of the method for realizing prediction of an observation value of a tracking station according to claim 1.

9. A device for realizing prediction of an observation value of a tracking station, comprising a determining module, an obtaining module, and a prediction module, wherein the determining module is configured to determine an observation value of a current epoch of a tracking station cannot be used in data processing;

the obtaining module is configured to obtain variations between the current epoch and the reference epoch, the variations comprising: a variation of a geometrical distance from the tracking station to a satellite between the current epoch and a reference epoch, a variation of a tropospheric error and a variation of an ionospheric error between the current epoch and the reference epoch, and a variation of a clock bias of the satellite between the current epoch and the reference epoch; and the prediction module is configured to estimate the observation value of the current epoch according to an observation value of the reference epoch of the tracking station and the obtained variations.

10. The device according to claim 9, further comprising an update module configured to, in response to correctly decoding the observation value of a new epoch after the reference epoch of the tracking station, update the saved observation value of the reference epoch of the tracking station with the observation value of the new epoch.

11. The device according to claim 9, wherein the determining module is configured to:

before cut-off time of each processing period, determine, in a case that observation of the tracking station does not arrive at a data processing center or has arrived at the processing center but there are errors exist in transmission, the observation value of the current epoch of the tracking station cannot be used in the data processing, wherein the cut-off time of each resolving period is equal to a sum of the observation time-tag of current epoch and a preset data delay threshold.

* * * * *